UNITED STATES PATENT OFFICE.

HUGO GELDERMANN, OF BERLIN-GROSS-LICHTERFELDE-OST, AND FERDINAND HAAS, OF BERLIN-TREPTOW, GERMANY, ASSIGNORS TO ACTIEN GESELLSCHAFT FÜR ANILIN FABRIKATION, OF BERLIN, GERMANY.

YELLOW DISAZO DYES.

1,166,346.  Specification of Letters Patent.  Patented Dec. 28, 1915.

No Drawing.  Application filed July 22, 1913. Serial No. 780,564.

*To all whom it may concern:*

Be it known that we, HUGO GELDERMANN and FERDINAND HAAS, citizens of the German Empire, residing at Berlin-Gross-Lichterfelde-Ost, Germany, and Berlin-Treptow, Germany, (our post-office addresses being Grabenstrasse 12, Berlin-Gross-Lichterfelde-Ost, Germany, and Lohmühlenstrasse 52, Berlin-Treptow, Germany, respectively,) have invented certain new and useful Improvements in Yellow Disazo Dyes, of which the following is a specification.

The present invention relates to the manufacture of new dyes which dye wool yellow fast to washing. These dyes derive from two molecules of amino-diaryl-ether sulfonic acids of the benzene series and one molecule of a dipyrazolone of the general formula:

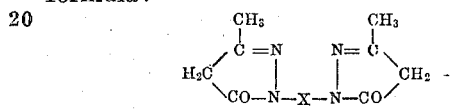

where X means an aromatic residue.

The dyes are in the shape of their sodium salts yellow powders easily soluble with a yellow color in warm water; on addition of concentrated caustic soda lye the dye is separated from the aqueous solution whereas hydrochloric acid separates the free dye acid in flakes. From the orange red solution in concentrated sulfuric acid the dye is separated on addition of ice. By reducing the dyes yield aminodiarylether sulfonic acids besides diamino-derivatives of dipyrazolones.

The following examples, the parts being by weight, illustrate how the dyes may be produced:

1. One diazotizes 53 parts of the sulfonic acid made by sulfonating 2-aminodiphenylether, with 14 parts of sodium nitrite and 100 parts of hydrochloric acid of 12° Bé. The diazo compound runs into a cooled solution of 40 parts of the dipyrazolone derived from 4.4′-dihydrazino-3.3′-dimethyl-diphenylmethane and acetoacetic ester, 24 parts of caustic soda-lye of 40° Bé. and 33 parts of calcined sodium carbonate. When the combination is complete the mass is warmed and the dyestuff is salted out. The dye corresponds, probably, to the formula:

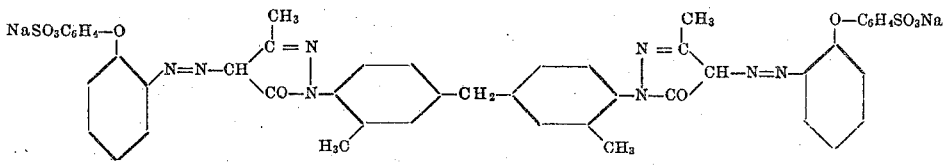

2. To the diazo compound, obtained as described in the example 1, a solution of 27 parts of acetoacetic ester and 33 parts of calcined sodium carbonate is added. The combination being complete the mass is rendered weakly acid, then mixed with 32.8 parts of 4.4′-dihydrazino-3.3′-dimethyldiphenylmethane and warmed for a short time, whereby the condensation occurs. The dye is transformed into its sodium salt and salted out. It is identical with the product of the Example 1.

The present invention is not limited to the foregoing examples or to the details given therein. Thus for instance isomerids, homologues and analogues of the said aminodiphenylether sulfonic acid may be used as also other dipyrazolones of other dihydrazins, the parent material for the production of dipyrazolones, deriving from other diamins, such as tolidin, 4.4′-diamino-3.3′-dichlorodiphenylmethane, 4.4′-diamino-2.5.2′.5′-tetramethyldiphenylmethane, 4.4′-diamino-3.3′-dimethylbenzophenone.

Having now described our invention and in what manner it may be performed what we claim is,—

1. As new articles of manufacture the disazo-dyes dyeing wool yellow; in the shape of their sodium salts being yellow powders, easily soluble in warm water to yellow solutions from which caustic soda-lye separates the dye salts, whereas hydrochloric acid sepranates the free dye acids; being soluble in concentrated sulfuric acid to an orange-red solution from which the dye is separated on addition of ice; being decomposed by reduction yielding aminodiaryl ether sulfonic acids of the benzene series besides diaminodipyrazolones; the new dyes deriving from 2 molecules of aminodiarylether sulfonic acids of the benzene series and 1 molecule of a dipyrazolone of the general formula:

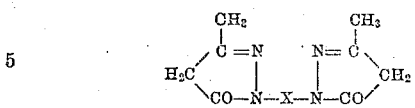

where X means an aromatic residue.

2. As a new article of manufacture the disazo dye dyeing wool yellow; in the shape of its sodium salt being a yellow powder easily soluble in warm water to a yellow solution from which caustic soda lye separates the dye salt, whereas hydrochloric acid separates the free dye acid; being soluble in concentrated sulfuric acid to an orange-red solution from which the dye separates on addition of ice; being decomposed by reduction yielding 2-amino-diphenylether sulfonic acid besides the diaminodipyrazolone deriving from 4.4'-dihydrazino-3.3'-dimethyldiphenylmethane and acetoacetic ester; the new dye deriving from 2 molecules of 2-aminodiphenylether sulfonic acid and 1 molecule of the dipyrazolone deriving from 4.4'-dihydrazino-3.3'-dimethyldiphenylmethane and aceto-acetic ester and corresponding probably to the formula:

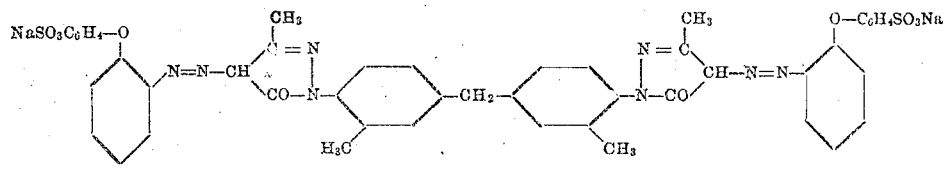

In testimony whereof we have hereunto set our hands in presence of two subscribing witnesses.

HUGO GELDERMANN.
FERDINAND HAAS.

Witnesses:
HENRY HASPER,
WOLDEMAR HAUPT.